(12) United States Patent
Vilato et al.

(10) Patent No.: US 7,375,307 B2
(45) Date of Patent: May 20, 2008

(54) GLASS-CERAMIC PLATES, METHOD FOR MAKING SAME AND COOKING SURFACE EQUIPPED WITH SAME

(75) Inventors: Pablo Vilato, Paris (FR); Sergio Moreira, Chateau-Thierry (FR); Franck Demol, Chateau-Thierry (FR)

(73) Assignee: Eurokera S.N.C., Chateau-Thierry (FR)

( * ) Notice: Subject to any disclaimer, the term of this patent is extended or adjusted under 35 U.S.C. 154(b) by 0 days.

(21) Appl. No.: 10/508,952

(22) PCT Filed: Apr. 9, 2003

(86) PCT No.: PCT/FR03/01111

§ 371 (c)(1),
(2), (4) Date: Mar. 28, 2005

(87) PCT Pub. No.: WO03/086019

PCT Pub. Date: Oct. 16, 2003

(65) Prior Publication Data

US 2005/0167416 A1 Aug. 4, 2005

(30) Foreign Application Priority Data

Apr. 10, 2002 (FR) .................................. 02 04472

(51) Int. Cl.
*H05B 3/68* (2006.01)
(52) U.S. Cl. ................................ 219/452.11; 219/460.1

(58) Field of Classification Search .. 219/443.1–468.2; 126/39 H, 39 J, 211
See application file for complete search history.

(56) References Cited

U.S. PATENT DOCUMENTS

| | | | | |
|---|---|---|---|---|
| 5,155,338 A * | 10/1992 | Hoffmann | ................ | 219/445.1 |
| 5,717,189 A * | 2/1998 | Goetz et al. | ................ | 219/483 |
| 5,885,315 A | 3/1999 | Pujol et al. | | |
| 6,103,338 A * | 8/2000 | Gille et al. | ................ | 428/121 |
| 6,118,103 A * | 9/2000 | Vilato et al. | ............. | 219/443.1 |
| 6,369,365 B1 | 4/2002 | Wennemann et al. | | |
| 6,492,624 B2 * | 12/2002 | Kosmas et al. | .......... | 219/460.1 |
| 6,849,328 B1 * | 2/2005 | Medwick et al. | ........... | 428/341 |

FOREIGN PATENT DOCUMENTS

DE 196 33 706 2/1998

* cited by examiner

*Primary Examiner*—Sang Paik
(74) *Attorney, Agent, or Firm*—Oblon, Spivak, McClelland, Maier & Neustadt, P.C.

(57) ABSTRACT

A glass-ceramic plate, a method of manufacturing a glass-ceramic plate, and hubs equipped with the glass-ceramic plate. A flat or substantially flat glass-ceramic plate includes a surface provided with pegs, the plate configured to equip a hob. At least one smooth region, free of pegs, is reserved in a location designed to come, in a mounted position, face to face with one or more elements of the hob, the blurred view of which due to the pegs must be improved.

12 Claims, 2 Drawing Sheets

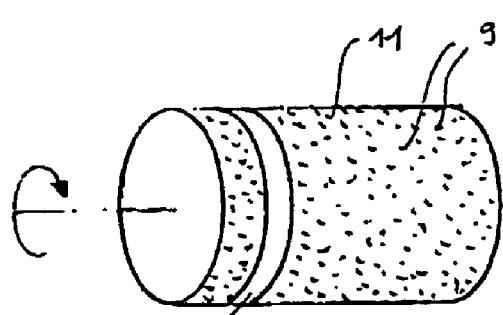
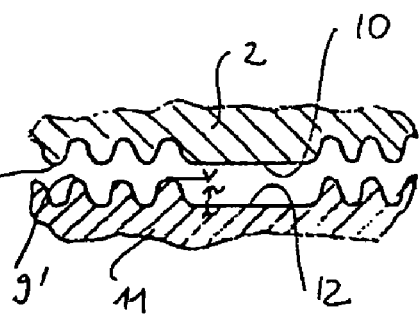
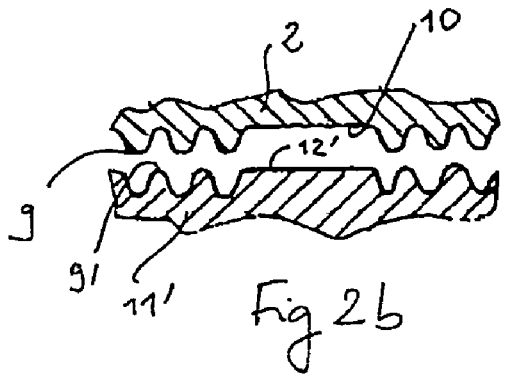
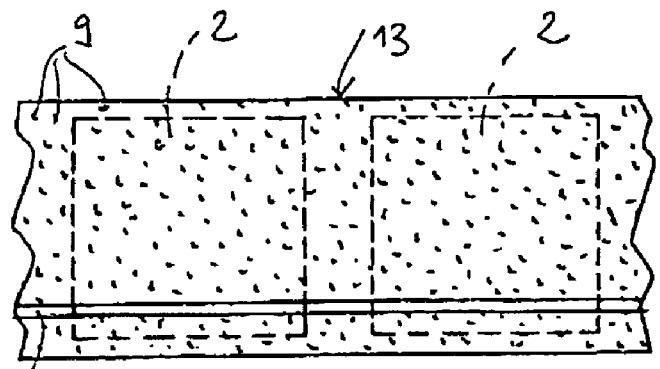
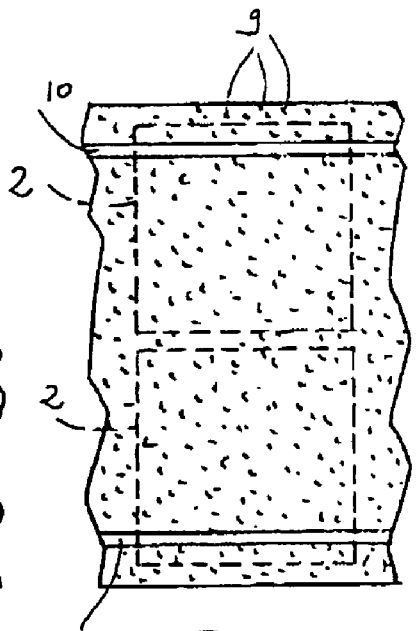

GLASS-CERAMIC PLATES, METHOD FOR MAKING SAME AND COOKING SURFACE EQUIPPED WITH SAME

The present invention relates to hot plates made from a glass-ceramic or from another similar material able to withstand high temperature and having a zero or almost zero expansion coefficient.

These plates, which are flat or essentially flat, are designed to cover heat elements or sources so as to form hobs. The heat sources are of various types: electrical heating elements, such as elements for heating by electrical resistance or radiant elements and halogen lamps; inductors or induction sources combining to bring about induction heating; and gas burners, it being possible for the heat sources of one and the same hob to be of one and the same type or of different types, such as radiant elements and gas burners (hobs referred to as "mixed" hobs).

Hobs also comprise control and adjustment means making it possible to vary the power of the sources (of which there are usually four) and possibly various indicators or lights.

These glass-ceramic hot plates or the like have seen immense success and are very broadly widespread especially since they benefit from an external appearance which is more modern than the conventional electrical plates and from ease of cleaning because the surface of a glass-ceramic plate is flat or essentially flat.

The term "essentially flat" is understood to mean that the glass-ceramic plate is flat but may also comprise, in some locations, deformations consisting either of concavities or hollow regions, or of bosses or reliefs or ridges.

Thus, mention may be made of the plates of the type described in French patent application FR-A-2 773 873 which comprises at least one concavity under which a heat source is placed and in which food can be directly cooked or a cooking container can be placed, it being moreover possible for the upper peripheral edge of the concavity to be raised from the plane of the plate.

Mention may also be made of the plates according to EP-A-0 930 806 which comprise hollows and reliefs making it possible for a visually handicapped user to find the location of a region and/or of a particular function of the plate by touch.

Also, mention may be made of the plates according to WO 01/38796 which possess deformed parts forming the top parts of the combustion chambers of gas burners, these deformed parts having slots for the output of flames and intake of air.

To produce the control and adjustment means making it possible to vary the power of the heating elements, traditional knobs fastened to axes passing through the holes made in the plate are now generally replaced by electronic touch-sensitive pads or capacitive pads, actuated by contact with a finger. The means for controlling and adjusting a means for heating or for maintaining temperature for example consist of a pair of pads, one of which serves to increment the power delivered to the source on each contact of the user's finger on this pad, while in contrast, the other serves to decrease stepwise the power of this same source. A multiplicity of pads corresponding to different heating powers may also be provided.

The glass-ceramic plate therefore no longer needs to be pierced as for control using knobs. It is enough to define the pads on the upper part of the plate, since just finger contact creates a capacitance with the other branch of the capacitor which is under the plate, the glass-ceramic acting as a dielectric.

In general, manufacture of the glass-ceramic plates comprises the following successive steps:

Melt-rolling: in a melting furnace, glass of a composition chosen in order to form the glass-ceramic is melted, then the molten glass is rolled into a standard ribbon or sheet by passing the molten glass between two rollers, generally an upper roller with a smooth surface for the purpose of obtaining a smooth upper surface for the plate and a lower negatively-etched roller, so as to obtain a lower plate surface provided with a network of bosses or pegs, for example hemispherical or semielliptical bosses or pegs. The height of these pegs is in particular about 0.10-0.30 mm; the distance between the pegs is about 1 to 5 mm; and the pegs are advantageously arranged in staggered rows; the roller with pegs is advantageously the lower roller, the pegs then facilitating driving;

Cutting the glass ribbon to the desired dimensions; as a general rule, two plates will be cut from the same ribbon;

Possibly formation by screen printing, generally on the upper surface of the plate and according to the design provided for each plate, of limits of the heating regions, of visual indicators corresponding to the location of the touch-sensitive pads and to their allocation to the various sources, of decoration (affixing the manufacturer's or vendor's mark) and of any desired patterns;

Ceramization: the plates, generally after cutting and possibly after screen printing are then baked according to the thermal profile chosen in order to transform the glass into the polycrystalline material called a "glass-ceramic" whose expansion coefficient is zero or almost zero and which withstands thermal shock which may go up to 700° C., while at the same time baking the enamel of the screen-printed patterns thus enabling them to be attach to the substrate.

When the glass-ceramic plate comprises shaped regions (raised regions, hollow regions, etc.), the manufacturing method comprises an operation, which can be carried out at any time during the conventional method, of collapsing, molding or pressing using a support or molding or pressing surfaces having the desired geometry, provided that the material forming the plate is at a sufficiently high temperature to allow the plastic deformation thereof.

The present invention relates to all the plate types which have just been described, which could if necessary have borings, and/or possibly added elements such as frame, connector(s), etc.

It is therefore noticed that these glass-ceramic plates have a generally smooth upper surface and a lower surface generally provided with pegs as described previously.

The upper surface is preferably smooth for electrical plates in order to allow good contact with the cooking containers and to transfer heat under the best conditions and in all cases for ease of cleaning and the esthetic appearance. This surface will be protected when the plates are transported.

The lower surface is provided with pegs (or bosses or studs or raised parts) so as generally to improve the mechanical strength of the plate. The pegs also ensure that there is no contact with the support plate during ceramization. In the event of shock on the top of the plate, the lower surface of the plate will be put in extension; if there is a defect in the plate, the microfissure will not propagate due to the presence of the pegs. Moreover, in the event of scratching, the latter will be discontinuous and will therefore be less visible and in all cases will be invisible if looking at it from the top of the plate. The pegs therefore provide useful passive protection.

At the same time, for a hob with halogen sources, the latter appear more cloudy and more blurred because of the presence of pegs, which has the benefit that the users are not dazzled by these elements.

However, although this blurring effect is beneficial for halogen elements, it is much less so for display modules, for example display modules known as "7-segment display modules" which are associated with touch-sensitive control pads, and which indicate the heating power of a given heating source to the user. Indeed, even when the material forming the plate is very weakly absorbing or diffusing with respect to a light source (for example, the transmission, through a plate of the Kerablack® type, of the red light from a "7-segment" display module is very good), the view of this source is deformed because of the pegs. The result of this is that, on the one hand, the view is not esthetically pleasing and that, on the other hand, reading the figures (or else messages, for example, with regard to the state of the cooking) may be so bad as to be illegible and could cause errors when cooking dishes, or even accidents.

To overcome this drawback, it is known and it is common current practice to apply a resin (such as silicone) having the same optical index as the glass-ceramic to the lower part of the plate so as to fill the hollows between the pegs in the regions designed to come face to face with the display modules in the assembled position of the hob. Thus a smooth surface is formed at this location, making it possible to improve the view of the display modules, without however completely removing this blurred vision.

It is also necessary to stress that the application of the index resin represents an additional step, at a later stage, consisting of high-accuracy work, with particular storage conditions (since the silicone polymerizes in 24 hours in dust-free air). This operation is therefore expensive. Furthermore, the drawback of poor ageing of the resin should not be excluded.

The filing company has therefore sought to provide a satisfactory solution to this problem, which has led it to modifying the surface of the roller with pegs in order to remove the pegs over at least one region chosen in order to keep, over the lower surface of the glass-ceramic plate, at least one peg-free region advantageously in a location designed to come face to face with an element such as a display module which it must be possible to see from above the plate without blurring.

Thus, the present invention makes it possible to overcome the drawback of the blurred view of the display modules by manufacturing plates which are partially free from pegs on the lower face, without however impairing the mechanical strength of the whole plate.

The subject of the present invention is therefore firstly a flat or substantially flat glass-ceramic plate comprising a surface provided with pegs, said plate being intended to equip a hob, characterized in that at least one smooth region, free of pegs, has been reserved in a location, this location being advantageously intended to come, in the mounted position, face to face with one or more elements of said hob for which the blurred view of which due to the pegs must be improved.

Such elements are in particular power display modules for example those known as "7-segment display modules", or other indicators, especially text indicators designed to be read, for example giving information concerning a cooking program to be followed, or else various lights.

Preferably, the smooth region of the surface provided with pegs of the plate is parallel to the other surface of the plate. The sought-after view then becomes clear since both faces of the plate are parallel in the viewing region.

According to the present invention, the smooth -region of the surface with pegs of the plate may be located in the plane of the projecting ends of the pegs; or in the plane of the bottoms of the hollow regions between the pegs; or in a plane intermediate between the plane of the projecting ends of the pegs and the plane of the bottoms of the hollow regions between the pegs. In the second case, an improved view will be obtained, insofar as the plate is thinner, which is sought after for a display module.

The pegs generally have a height of 0.10 to 0.30 mm.

According to a particular embodiment of the glass-ceramic plate according to the invention, the surface with pegs of the latter comprises a smooth region, without pegs, which region is formed by a strip parallel to one of the edges of the plate, near to said edge, said strip corresponding to the area of a series of display modules for displaying heating powers or other information for the user. The surface opposite the surface with pegs of the plate may also have a boss or a groove parallel to the strip without pegs in the neighboring area of the latter opposite said edge.

The formation of the strip without pegs, notably by the rolling as mentioned in the present invention, can also induce on the surface opposite to the surface with pegs of the plate the presence of one or more undulations or waves (especially of the order of 1 to a few micrometers of height compared to the plane of the plate), facing (or above) the area without pegs and parallel to the strip without pegs the plate according to the invention and obtained by the rolling as mentioned, is consequently to be generally distinguished from the existing products not only by a least one area without pegs but also by the presence, on the opposite surface, facing the area without pegs, of this or these undulations or waves (generally a double range of undulations). Yet, it is also possible, by modifying the surface (for example by machining) of the second roller (that of the face opposite to the one with pegs, generally the upper roller) to reduce or remove these undulations. It is also possible to form one or more additional undulations, and/or one or more bosses or waves or raised parts or profile variations not disturbing the vision (these variations can possibly go from 0.1 to 3 mm of height), in neighbouring or facing area(s) (or possibly not) compared to the area without pegs and on the opposite face; for example, it is possible to form a wave on the edge of the area facing the area without pegs on the opposite face, this wave diminishing the phenomena of undulations due to the rolling process.

According to a mode of realization of the glass-ceramic plate according to the invention, the smooth region or regions of its surface with pegs are protected during transport of the plate by means of a polymer, for example a peelable transparent protective sheet made of polyethylene, which is removed when assembling the hob.

The present invention also relates to a hob, in particular of the radiant element, halogen element, induction or gas burner type or of mixed type, said hob being equipped with a glass-ceramic plate as defined above, the peg-free region or regions corresponding especially to the areas of the display modules for displaying the heating powers or other information useful to the user.

The subject of the present invention is also a process and an apparatus for manufacturing, by melt-rolling, a glass-ceramic plate as defined above, comprising respectively a rolling step and a rolling device consisting of two rollers between which the molten glass to be rolled is passed in order to obtain a ribbon whose length corresponds to one or more plates, one of the rollers, generally the lower roller, comprising a surface with pegs, characterized in that the roller with pegs has been modified in order to comprise at least one smooth region free of pegs, the smooth region or regions on the surface of said roller having been dimensioned and positioned in order to form, during rolling, at least one peg-free region on the surface of the ribbon, dimensioned and positioned generally in order to be, after the operation of cutting the ribbon into plates having their final dimensions, face to face with one or more elements of said plates the blurred view of which due to the pegs must be improved.

In particular, a process or apparatus according to the invention intended to form a plate whose smooth region is a strip as was described above is characterized in that the peg-free region of the lower roller consists of a strip or a portion of cylindrical strip which is located close to an edge of the roller, in order to obtain in this way the lower peg-free strip parallel to the edge of the plate.

To better illustrate the subject of the present invention, particular embodiments will now be described with reference to the appended drawings in which:

FIG. 2 is a perspective view of a lower roller, modified according to the present invention;

FIG. 2a is, on a larger scale, a partial sectional view of the roller of FIG. 2, showing the peg-free region of the roller, and the corresponding area of the glass-ceramic plate; FIG. 2b is a variant of FIG. 2a;

FIG. 3 is a view showing the side with pegs of the glass ribbon obtained after rolling with the lower roller of FIG. 2, the cutting lines of the plates being shown by mixed lines;

FIG. 4 is a view similar to FIG. 3 showing a ribbon obtained with a roller made according to a variant of the roller of FIG. 2.

Figure 1A:
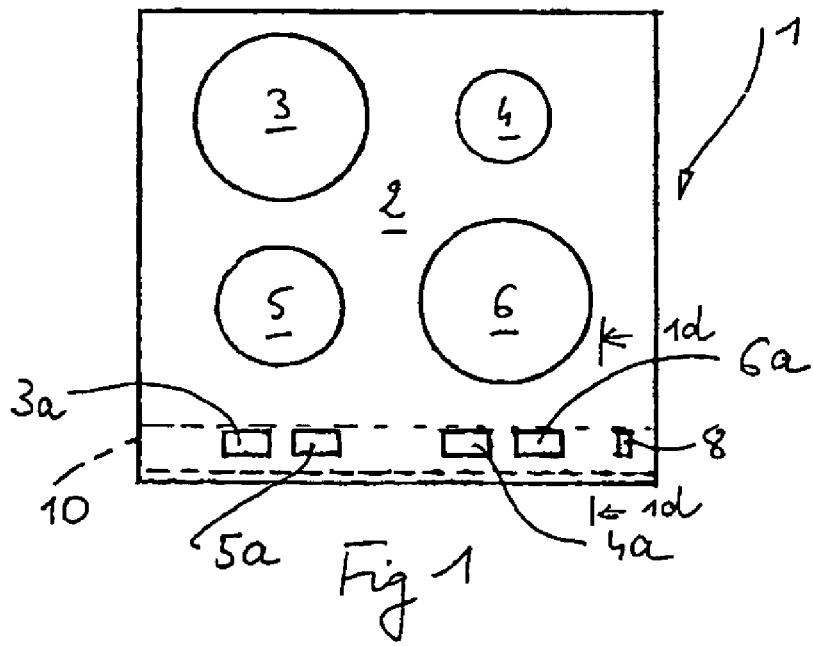
FIG. 1a is an enlarged view of a region for adjusting the heating power of a heat source of the hob of FIG. 1.
Figure 1A:

In FIG. 1, a schematic view of a hob 1 according to the invention is shown, comprising a flat glass-ceramic plate 2 on which the regions 3 to 6 of the four heat sources have been defined conventionally, by screen printing and, on the lower edge, the regions 3a to 6a of the touch-sensitive pads controlling the heating power of the respective sources. The upper part of the plate 2 may comprise, along its lower edge, a ridge 7 or a groove 7' as can be seen in FIGS. 1e and 1f respectively, which separate the major area comprising the regions of the sources and the edge strip which comprises the touch-sensitive pads.

The glass-ceramic of the plate 2 is colored (for example brown, white) and when the plate 2 is in service, each of the display modules equipping the hob 1 under each of the touch-sensitive pads 3a to 6a can be seen by transparency, as shown in FIG. 1a, together with the general switch 8.

The display module shown in FIG. 1a is a conventional 7-segment display module, the figure formed showing the heating power, the user pressing several times to the right on the + in order to increase the power or on the − in order to decrease the latter.

Figure 1B:
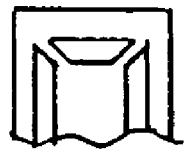
FIGS. 1b and 1c are detailed views of the upper part of the 7 segment display module, as it appears respectively with and without the means of the present invention.
Figure 1C:
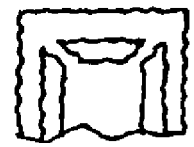
Figure 1D:
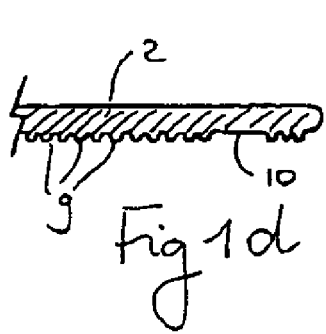
FIG. 1d is a sectional view along 1d-1d of FIG. 1, FIGS. 1e and 1f showing two variants.
Figure 1E:
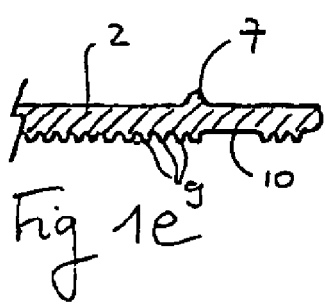
FIG. 1 is a schematic top view of a glass-ceramic hob of the invention.
Figure 1F:
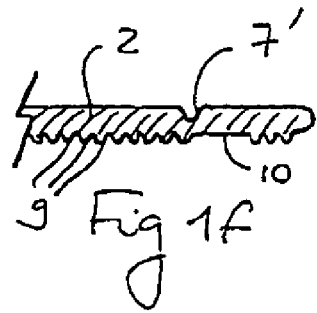

The figure appears clearly in FIG. 1b which illustrates the invention and blurred in FIG. 1c which illustrates the prior art. This is because, as explained above, the lower surface of the plate 2 is provided with a network of pegs 9 (see FIG. 1d) over its entire surface for a conventional plate, while these pegs 9 have been removed in the strip 10 facing the display modules in the plate 2 according to the invention.

In the case illustrated, the plane of the strip 10 is that of the bottoms of the hollow regions between the pegs 9, which provides a perfect view of the display modules.

This strip 10 parallel to the upper surface of the plate 2 is obtained by using a negatively-etched lower roller made of steel (with a hollow region depth of for example d=0.2 mm, which will give pegs of 0.14 mm high), except over a strip 12 close to one of its edges which is smooth. Rolling with a set of rollers (smooth upper roller, not shown, and lower roller 11) of a glass ribbon 13 in which two plates 2 are capable of being cut, will form the sought-after smooth strip 10 (FIG. 3).

The glass ribbon of FIG. 4 will be formed with a roller comprising two regions free of pegs, in order to form two plates which are head to tail.

As can be deduced from FIGS. 2a and 2b, the depth of the smooth region of a lower roller 11 may vary from 0 to d. For the variant of FIG. 2a, the roller has been machined at a later stage thereby removing the pegs in the smooth region. For the variant of FIG. 2b, a roller 11' etched with pegs except in the smooth region 12' has been provided for.

It is of course understood that the particular embodiments described above have been given by way of non-limiting indication and that modifications and variants may be provided without in any way departing from the scope of the present invention. In particular, the surface with pegs has been described as being only the lower surface, but where the upper surface would have, or would also have, irregularities of the same type, the same solution of smooth region(s) corresponding to the area through which a clear view of the lights and display modules, etc. is desired, is to be recommended, and therefore a suitable treatment of the corresponding roller.

The invention claimed is:

1. A glass-ceramic plate comprising:
   a first surface provided with pegs, the plate configured to equip a hob; and
   a second surface, opposite the first surface,
   wherein at least one smooth region, free of pegs, is reserved in a location on the first surface, in a mounted position, face to face with one or more elements viewable through the at least one smooth region, and
   the second surface includes a raised boss in a neighboring area opposite the at least one smooth region,
   the boss extends from a first edge of the glass-ceramic plate to a second edge of the glass-ceramic plate, and
   the boss is a portion of the glass-ceramic plate with a first thickness, and the first thickness is greater than a second thickness of the glass-ceramic plate measured at a portion of the glass-ceramic plate adjacent the boss.

2. The glass-ceramic plate as claimed in claim 1, wherein the at least one smooth region of the first surface is parallel to the second surface.

3. The glass-ceramic plate according to claim 2, wherein the at least one smooth region of the first surface is located in a plane of projecting ends of the pegs; or in a plane of bottoms of hollow regions between the pegs; or in a plane intermediate between the plane of the projecting ends of the pegs and the plane of the bottoms of the hollow regions between the pegs.

4. The glass-ceramic plate as claimed in claim 1, wherein the first surface provided with pegs comprises a smooth region, without pegs, which smooth region is formed by a strip parallel to one edge of the plate, near to the edge, the strip corresponding to an area of a series of display modules for displaying heating powers or other information for a user.

5. The plate as claimed in claim 4, wherein the second surface comprises a groove parallel to the strip in a neighboring area of the strip opposite the edge.

6. The plate as claimed in claim 1, wherein the second surface comprises one or more undulations, facing the at least one smooth region free of pegs.

7. The plate as claimed in claim 1, wherein the pegs have a height of from 0.10 to 0.30 mm.

8. The plate as claimed in claim 1, wherein the at least one smooth region of the first surface is protected during transport of the plate by a polymer, which can include a peelable transparent protective sheet made of polyethylene.

9. A hob, comprising:
   a glass-ceramic plate as defined in claim 1, the at least one smooth region free of pegs corresponding to areas of display modules for displaying heating powers or other information useful to a user.

10. The glass-ceramic plate as claimed in claim 1, wherein the boss extends in a straight line from the first edge to the second edge.

11. A glass-ceramic plate comprising:
   a first surface provided with pegs, the plate configured to equip a hob; and
   a second surface, opposite the first surface,
   wherein at least one smooth region, free of pegs, is reserved in a location on the first surface, in a mounted position, face to face with one or more elements viewable through the at least one smooth region, and the second surface includes a raised boss opposite a boundary of the at least one smooth region,
   the boss extends from a first edge of the glass-ceramic plate to a second edge of the glass-ceramic plate, and
   the boss is a portion of the glass-ceramic plate with a first thickness, and the first thickness is greater than a second thickness of the glass-ceramic plate measured at a portion of the glass-ceramic plate adjacent the boss.

12. The glass-ceramic plate as claimed in claim 11, wherein the boss extends in a straight line from the first edge to the second edge.

\* \* \* \* \*